US006596245B2

(12) United States Patent
Fachinetti et al.

(10) Patent No.: US 6,596,245 B2
(45) Date of Patent: Jul. 22, 2003

(54) PROCESS FOR THE RECOVERY AND REFINING OF RHODIUM

(75) Inventors: Giuseppe Fachinetti, Pisa (IT); Tiziana Funaioli, S.Prospero di Cascina (IT)

(73) Assignee: Chimet S.p.A., Arezzo (IT)

( * ) Notice: Subject to any disclaimer, the term of this patent is extended or adjusted under 35 U.S.C. 154(b) by 25 days.

(21) Appl. No.: 09/819,319

(22) Filed: Mar. 28, 2001

(65) Prior Publication Data

US 2001/0025548 A1 Oct. 4, 2001

(30) Foreign Application Priority Data

Mar. 31, 2000 (IT) ...................................... MI2000A0694

(51) Int. Cl.$^7$ .............................................. C22B 11/00
(52) U.S. Cl. ............................ 423/22; 423/417; 75/426
(58) Field of Search .......................... 423/22, 418, 417; 75/426, 720, 631

(56) References Cited

U.S. PATENT DOCUMENTS

| 3,823,220 A | | 7/1974 | Donaruma et al. |
| 3,887,489 A | * | 6/1975 | Fannin et al. ................. 423/22 |
| 4,007,130 A | * | 2/1977 | Leach et al. |
| 4,312,779 A | | 1/1982 | Quick |
| 4,557,760 A | * | 12/1985 | Erpenbach et al. ........... 423/22 |
| 5,102,632 A | * | 4/1992 | Allen et al. .................... 423/22 |
| 5,165,901 A | * | 11/1992 | Crozier et al. ................ 423/22 |
| 5,478,376 A | | 12/1995 | Grant et al. |

FOREIGN PATENT DOCUMENTS

| DD | 256 808 | 5/1988 |
| EP | 0 128 439 | 12/1984 |
| GB | 1 010 427 | 11/1965 |
| GB | 1 089 132 | 11/1967 |
| GB | 1 296 435 | 11/1972 |

OTHER PUBLICATIONS

Database WP, Section Ch, Week 199642, Derwent Abstract XP–002171577 no month, no year.
Database WP, Section Ch, Week 197834, Derwent Abstract XP–002171575 no month, no year.

* cited by examiner

Primary Examiner—Steven Bos
(74) Attorney, Agent, or Firm—Hedman & Costigan, P.C.

(57) ABSTRACT

The present invention relates to a process for the recovery and refining of rhodium starting from a mixture containing rhodium and other transition metals, including those of the platinum Group, as well as metals of the main Groups, said process comprising the following passages: a) formation of an adduct between rhodium trichloride and a halide of a metal selected from metals of Groups IIA, IIIA, IVA, IVB, VB and VIB; b) carbonylation of the precipitated adduct, deriving from passage a) with the formation of rhodium halogen carbonyls and c) sublimation of the carbonylated product obtained in the previous passage.

The main advantage of the above process consists in the production of an extremely pure product, with excellent yields.

20 Claims, No Drawings

PROCESS FOR THE RECOVERY AND REFINING OF RHODIUM

BACKGROUND OF THE INVENTION

The present invention relates to a process for the recovery and refining of rhodium.

The state of the art describes and adopts various methods for the recovery and refining of rhodium. These methods, however, are always characterized by the presence of a high number of passages and, above all, have decidedly low yields to recovered and refined rhodium.

As a result, considerable quantities of non-recovered rhodium accumulate in the refining plants of precious metals, with obvious economic damage, as rhodium is extremely costly.

The process according to the present invention proposes a way of overcoming the disadvantages of the process according to the known art.

SUMMARY OF THE INVENTION

The present invention therefore relates to a process for the recovery and refining of rhodium starting from a mixture containing rhodium and other transition metals, including those of the platinum Group as well as metals of the main Groups, said process being characterized by the following passages:

a) formation of an adduct between rhodium trichloride and a halide of a metal selected from metals of Groups IIA, IIIA, IVA, IVB, VB and VIB;

b) carbonylation of the precipitated adduct, deriving from passage a) with the formation of rhodium halogen carbonyls;

c) sublimation of the carbonylated product obtained in the previous passage.

The process according to the present invention may also comprise the following passages:

d) oxidation to rhodium trichloride hydrate of the complex $Rh_2(CO)_4Cl_2$ obtained at the end of passage c), the halide of the metal in passage a) being a chloride;

e) reduction with hydrogen, at a high temperature, of the rhodium trichloride hydrate deriving from the oxidation of passage d).

A second object of the present invention relates to a rhodium sponge obtainable by means of a process which, starting from a mixture containing rhodium and other transition metals, including those of the platinum Group as well as those of the main Groups, comprises the following passages:

a) formation of an adduct between rhodium trichloride and a chloride of a metal selected from metals of Groups IIA, IIIA, IVA, IVB, VB and VIB;

b) carbonylation of the precipitated adduct, deriving from passage a) with the formation of rhodium chloro carbonyls;

c) sublimation of the carbonylated product obtained in the previous passage.

d) oxidation to rhodium trichloride hydrate of the complex $Rh_2(CO)_4Cl_2$ obtained at the end of passage c);

e) reduction with hydrogen, at a high temperature, of the rhodium trichloride hydrate deriving from the oxidation of passage d).

The main advantage of the process according to the present invention consists in recovering and refining rhodium until a product having a purity of over 99.99% is obtained, with yields varying from 30 to 90%.

DETAILED DESCRIPTION OF THE INVENTION

In particular, passage a) of the process according to the present invention, i.e. the formation of an adduct between rhodium trichloride and a halide of a metal selected from metals of Groups IIA, IIIA, IVA, IVB, VB and VIB, is carried out in the presence of free hydrochloric acid and by the addition of a quantity of metal halide, sufficient to cause the precipitation of the adduct in the form of a solid. Said adduct is insoluble in hydrochloric acid.

The halide of the metal selected from the metals of Groups IIA, IIIA, IVA, IVB, VB and VIB is preferably a chloride.

In particular, it is preferably anhydrous aluminum trichloride or anhydrous vanadium trichloride.

The free hydrochloric acid is preferably concentrated. In particular, the concentrated hydrochloric acid is hydrochloric acid at 37%.

The precipitated solid consists of the adduct between rhodium trichloride and the metal halide, as indicated above, and contains rhodium in a percentage varying from 2 to 20%, whereas the other metals substantially remain in solution.

The solid, i.e. the adduct, deriving from passage a) is then washed with alcohols and subjected to passage b), i.e. to the carbonylation reaction.

The carbonylation reaction is carried out, according to a first alternative, in an aqueous solution with a concentration of rhodium varying from 5 g/l to 300 g/l, under vigorous stirring, the partial CO pressure being kept within the range of 300 hPa to 5.065 MPa, at a temperature ranging from 10° C. to 100° C.

The concentration of rhodium preferably ranges from 50 g/l to 200 g/l.

In particular, the partial CO pressure is maintained within a range of 400 to 2000 hPa and the temperature within a range of 20° C. to 50° C.

Once the absorption of CO in the solution is complete, the carbonylated product obtained, consisting of neutral or anionic rhodium halogen carbonyl complexes, is subjected to the subsequent sublimation reaction.

In particular, the carbonylated product obtained, consisting of neutral or anionic rhodium halogen carbonyl complexes, is extracted with an organic solvent.

Said organic solvent can be selected from the group consisting of ethers, esters, carboxylic acids, alkyl halides, alcohols, halogenated compounds, hydrocarbons.

The organic solvent is preferably an ether or an alkyl halide. It is even more preferably MTBE or $CH_2Cl_2$.

The organic phase is then concentrated to a dry product and subjected to sublimation.

In particular, the sublimation reaction is carried out under vacuum, at pressures lower than 10 mmHg, and at a temperature lower than 110° C.

Furthermore, if an even higher purity is desired, the sublimation reaction can be repeated twice.

Alternatively, the carbonylation reaction can be carried out by heating the solids, i.e. the adduct coming from passage a), to 100° C., in a PYREX® tube in a stream of CO, PYREX® is defined as a trademark used for glass and glassware that contains appreciable oxide of boron and is resistant to heat, chemicals and electricity.

According to this alternative, the sublimation of the final product therefore takes place directly on the cold part of the PYREX® tube.

In particular, when the metal halide in passage a) is a chloride, the product obtained from the sublimation reaction consists of rhodium (I)chlorocarbonyl dimer i.e. $Rh_2(CO)_4Cl_2$.

This product is an extremely important product as it is the starting product for the subsequent synthesis of a wide variety of rhodium derivatives.

In addition, $Rh_2(CO)_4Cl_2$ can be transformed into rhodium sponge by means of oxidation and subsequent high temperature hydrogenation.

In particular, the oxidation reaction which produces rhodium trichloride hydrate can be effected with $HNO_3$ or $H_2O_2$ in hydrochloric acid.

At the end of the oxidation, the solution is then evaporated to dryness, on a water bath, and the product obtained, consisting of rhodium trichloride hydrate with a rhodium content of about 50%, is then subjected to hydrogenation in a quartz tube, in a stream of hydrogen at 500° C.

The rhodium sponge which is and can be obtained with this process, has a purity of over 99.99%, has a shiny grey color and excellent particle size characteristics.

In particular, the equipment used for the process according to the present invention comprises a reactor in which the formation of the adduct between rhodium trichloride and the halide of a metal selected from metals of Groups IIA, IIIA, IVA, IVB, VB and VIB, takes place; a washing system with alcohols of the solid thus obtained, a subsequent carbonylation reactor, equipped with a stirring system, in which the extraction with an organic solvent can also be effected, a system for the concentration and drying of the organic extract and finally a sublimation apparatus.

In a particular embodiment, the sublimator consists of a glass container with a sealed metal lid (for example a screw top), of which the seal consists of gaskets made of TEFLON® (composition as defined on Mar. 28, 2001 by DuPont Chemicals) or any material resistant to acids. The lid has a hole in the center in which a glass tube is inserted, having a diameter ranging from 2 to 40 cm and a height ranging from 50 to 200 cm or more, with a flange at the top equipped with a rubber holder to which the tube coming form the vacuum pump is connected.

During the drying phase, cold traps must be inserted between the sublimator and the pump in order to separate the organic vapours, the water and/or hydrochloric acid which would cause a rapid deterioration of the pump itself. The pump moreover should have a high flow-rate as, during the sublimation of the dry residue, there may be a slight decomposition of the rhodium halogen carbonyl complex, and the gas which is formed must be removed. The necessity for temperatures which are too high for the sublimation should be avoided.

The sublimate is deposited in the form of crystals on the cold wall of the tube situated above the sublimator base which is immersed in an oil bath thermostat-regulated at temperatures not higher than 110° C.

The main advantage of the process according to the present invention is to recover and refine rhodium until a product having a purity of over 99.99% is obtained, with yields varying from 30 to 90%.

A further extremely significant advantage of the process according to the present invention is to recover rhodium as first product of the refining process of a mixture containing chlorides of metals of the platinum Group.

The characteristics and advantages of the process according to the present invention can be better understood from the following examples.

EXAMPLE 1

A liter of a hydrochloric solution containing 10 g of rhodium, 10 g of platinum, 5 g of palladium, 4 g of ruthenium, 2 g of iridium, 6 g of iron, 4 g of cobalt as well as 5 g of sodium, 4 g of calcium and lesser impurities of other metals, all in the form of chlorides, is treated with anhydrous $AlCl_3$ in a quantity sufficient to cause the precipitation of a red adduct between aluminum trichloride and rhodium chloride, containing about 10% of rhodium when wet.

This adduct is recovered on a filter and washed on the filter with small quantities of ethyl alcohol having a concentration higher than 90%.

The red residue thus obtained is transferred to a carbonylation reactor containing 250 ml of water and the resulting solution is stirred vigorously in an atmosphere of CO. The partial CO pressure is maintained at a value higher than or equal to 500 hPa, at room temperature.

Once the absorption of CO on the part of the solution has stopped, the reaction is brought to an end, typically after 24 hours. 300 ml of methyl tertiary butyl ether (MTBE) are added to the same carbonylation reactor and the stirring is briefly restarted. The aqueous phase and organic phase are separated and the ether extract is distilled at atmospheric pressure leaving a black viscous residue. Any possible traces of ether, water and hydrochloric acid are removed under vacuum.

The dry residue is then transferred to the sublimator described above and sublimated under a pressure lower than 10 mmHg and at a temperature of less than 110° C.

A black residue is obtained whereas the sublimate consisting of red $Rh_2(CO)_4Cl_2$ crystals is collected on the walls of the glass tube.

14.17 g of product are obtained with a yield of 75%. The product obtained has a purity of over 99.99%.

EXAMPLE 2

A liter of a hydrochloric solution containing 10 g of rhodium, 10 g of platinum, 5 g of palladium, 4 g of ruthenium, 2 g of iridium, 6 g of iron, 4 g of cobalt as well as 5 g of sodium, 4 g of calcium and lesser impurities of other metals, all in the form of chlorides, is treated with anhydrous $VCl_3$ in a quantity sufficient to cause the precipitation of an adduct between vanadium trichloride and rhodium chloride containing about 10% of rhodium, when wet.

This adduct is recovered on a filter and washed on the filter with small quantities of ethyl alcohol having a concentration higher than 90%.

The residue thus obtained is transferred to a carbonylation reactor containing 250 ml of water and the resulting solution is stirred vigorously in an atmosphere of CO. The partial CO pressure is maintained at a value higher than or equal to 500 hPa, at room temperature.

Once the absorption of CO on the part of the solution has stopped, the reaction is brought to an end, typically after 24 hours. 300 ml of $CH_2Cl_2$ are added to the same carbonylation reactor and the stirring is briefly restarted. The aqueous phase and organic phase are separated and the organic extract is distilled at atmospheric pressure leaving a black viscous residue. Any possible traces of $CH_2Cl_2$, water and hydrochloric acid are removed under vacuum.

The dry residue is then transferred to the sublimator described above and sublimated at a reduced pressure and at a temperature lower than 110° C.

A black residue is obtained whereas the sublimate consisting of red $Rh_2(CO)_4Cl_2$ crystals is collected on the cold walls of the glass tube.

11.33 g of product are obtained with a yield of 60%. The product obtained has a purity of over 99.99%.

EXAMPLE 3

A liter of a hydrochloric solution containing 10 g of rhodium, 10 g of platinum, 5 g of palladium, 4 g of ruthenium, 2 g of iridium, 6 g of iron, 4 g of cobalt as well as 5 g of sodium, 4 g of calcium and lesser impurities of other metals, all in the form of chlorides, is treated with anhydrous $AlCl_3$ in a quantity sufficient to cause the precipitation of a red adduct between aluminum trichloride and rhodium chloride containing about 10% of rhodium, when wet.

This adduct is recovered on a filter and washed on the filter with small quantities of ethyl alcohol having a concentration higher than 90%.

The red residue thus obtained is transferred to a PYREX® tube and heated to 100° C. in a stream of carbon monoxide. Red $Rh_2(Co)_4Cl_2$ crystals are deposited at the cold end of the tube, which are deposited.

7.56 g of product are obtained with a yield of 40%. The product obtained has a purity of over 99.99%.

What is claimed is:

1. A process for the recovery and refining of rhodium starting from a mixture containing rhodium and other transition metals, including those of the platinum Group of the Periodic Table of the Elements as well as the remaining metals of the Periodic Table of the Elements, said process being characterized by the following passages:
   a) formation of a precipitated adduct between rhodium trichloride and a halide of a metal selected from metals from the Periodic Table of the Elements Groups IIA, IIIA, IVA, IVB, VB and VIB;
   b) carbonylation of the precipitated adduct, from passage a) with the formation of rhodium halogen carbonyls;
   c) sublimation of the carbonylated product obtained in b).

2. The process according to claim 1, characterized in that said process further comprises the following passages:
   d) oxidation to rhodium trichloride hydrate of a $Rh_2(CO)_4Cl_2$ complex obtained at the end of passage c), when the halide of the metal in passage a) is a chloride;
   e) reduction with hydrogen of the rhodium trichloride hydrate from the oxidation of passage d).

3. The process according to claim 1, characterized in that the formation of the adduct between rhodium trichloride and halide of a metal selected from metals from the Periodic Table of the Elements Groups IIA, IIIA, IVA, IVB, VB and VIB, is effected in the presence of free hydrochloric acid and by the addition of a quantity of metal halide sufficient to cause the precipitation of the adduct.

4. The process according to claim 1, characterized in that the halide of the metal selected from metals from the Periodic Table of the Elements Groups IIA, IIIA, IVA, IVB, VB and VIB is a chloride.

5. The process according to claim 1, characterized in that the halide of the metal selected from metals from the Periodic Table of the Elements Groups IIA, IIIA, IVA, IVB, VB and VIB is anhydrous aluminum trichloride or anhydrous vanadium trichloride.

6. The process according to claim 3, characterized in that the free hydrochloric acid is concentrated.

7. The process according to claim 6, characterized in that the concentrated hydrochloric acid is hydrochloric acid at 37%.

8. The process according to claim 1, characterized in that the adduct deriving from passage a) is washed with alcohols before being subjected to passage b).

9. The process according to claim 1, characterized in that the carbonylation reaction is carried out in an aqueous solution with a concentration of rhodium varying from 5 g/l to 300 g/l, under vigorous stirring, the partial CO pressure being kept within a range of 300 kPa to 5.065 MPa, at a temperature ranging from 10° C. to 100° C.

10. The process according to claim 9, characterized in that the concentration of rhodium varies from 50 g/l to 200 g/l.

11. The process according to claim 9, characterized in that the partial CO pressure is kept within a range of 400 to 2000 kPa and the temperature within a range of 20° C. to 50° C.

12. The process according to claim 1, characterized in that the carbonylated product at the end of passage b) consisting of rhodium halogen carbonyl, is extracted with an organic solvent, and concentrated to dryness, before sublimation.

13. The process according to claim 12, characterized in that the organic solvent is selected from ethers, esters, carboxylic acids, alcohols, alkyl halides and hydrocarbons.

14. The process according to claim 12, characterized in that the organic solvent is an ether or an alkyl halide.

15. The process according to claim 12, characterized in that the organic solvent is MTBE or $CH_2Cl_2$.

16. The process according to claim 1, characterized in that the sublimation reaction is carried out under vacuum, at pressures lower than 10 mmHg, and at a temperature lower than 110° C.

17. The process according to claim 1, characterized in that the carbonylation reaction is carried out by heating the adduct deriving from passage a) to 100° C., in a PYREX® tube, in a stream of CO.

18. The process according to claim 17, characterized in that the sublimation of the carbonylated product takes place directly on the cold part of the PYREX® tube.

19. The process according to claim 2, characterized in that the oxidation reaction is carried out with $HNO_3$ or $H_2O_2$ in hydrochloric acid.

20. The process according to claim 2, characterized in that the reduction reaction is carried out in a quartz tube, in a stream of hydrogen at 500° C.

* * * * *